Dec. 29, 1931.  A. PELZ  1,839,163
FORMATION OF PAPER BAGS
Filed Oct. 11, 1929  3 Sheets-Sheet 1

INVENTOR:
ALFONS PELZ.

Sturtevant & Mason
ATTORNEYS

Dec. 29, 1931.  A. PELZ  1,839,163

FORMATION OF PAPER BAGS

Filed Oct. 11, 1929   3 Sheets-Sheet 2

INVENTOR:
ALFONS PELZ
By Sturtevant & Mason
ATT'YS

Dec. 29, 1931.    A. PELZ    1,839,163
FORMATION OF PAPER BAGS
Filed Oct. 11, 1929    3 Sheets-Sheet 3

INVENTOR:
ALFONS PELZ
BY Sturtevant & Mason
ATT'YS

Patented Dec. 29, 1931

1,839,163

UNITED STATES PATENT OFFICE

ALFONS PELZ, OF OPPELN, GERMANY

FORMATION OF PAPER BAGS

Application filed October 11, 1929, Serial No. 398,937, and in Germany May 23, 1929.

The formation of a paper bag, as employed for example for the reception and transport of cement of a farinaceous nature, and the construction of a template suitable for the production of the bag are mutually dependent, and will therefore be hereinafter described together.

The object of the invention is to provide a paper bag consisting of a plurality of sections and particularly suitable for packing finely divided material and so simply constructed that it may be rapidly formed by means of templates at relatively low cost.

The invention further relates to a device for the production of a paper bag by means of templates.

The paper bag according to the invention comprises a multi-layer tube (outer bag) having a re-inforced strong bottom edge and an inner bag for directly receiving the material and freely suspended and protected in the outer bag. A special de-aerating device according to the invention prevents escape of dust.

The device for producing this bag and similar bags consists of two templates so constructed that they facilitate the work which has to be carried out on a paper blank made in the form of a tube open at both sides in order to convert it into a paper bag ready for use, so that in comparatively short time bags may be made accurately and uniformly.

One form of paper bag and device for use in the manufacture thereof according to the invention are illustrated by way of example in the accompanying drawings in which:—

Figures 1 to 6 illustrate the bag-making device, and

Figures 7 to 24 the paper bag.

The paper bag produced with the aid of the device according to Figures 1 to 6 is illustrated in Figures 7 to 22 on a smaller scale than that of the device in order to enable the formation of the bag to be followed more easily.

Figure 1 is a front elevation of the inner template B.

Figure 19 is a plan view showing the bag after the top flanges have been folded in.

Figure 2:
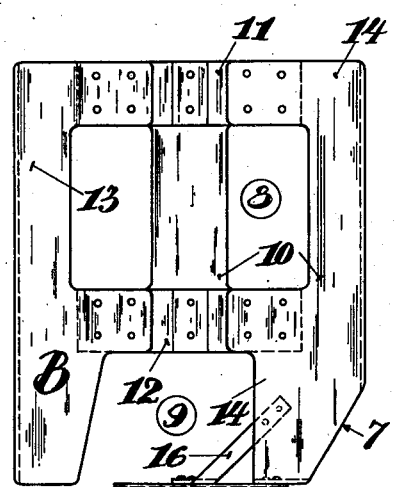
Figure 2 is a plan view corresponding to Figure 1.
Figure 3:
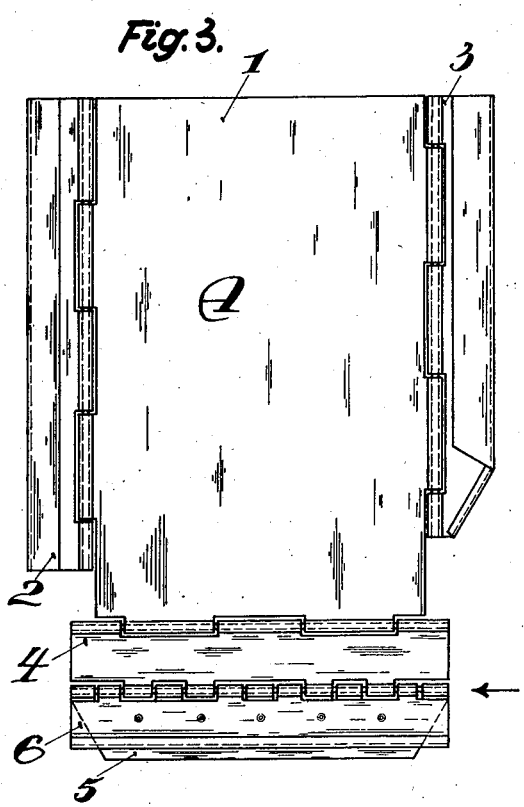
Figure 3 is a plan of the outer template A.

The device for producing a bag consists of a pair of templates viz., an outer template A Figures 3 to 6, and an inner template B Figures 1 to 2.

The outer template A is a rectangular plate 1 made of aluminium. Flaps 2 are hinged to the longitudinal edges of the plate 1, whilst a flap 4 is hinged to the end or transverse edge of the plate.

Two other flaps are hinged to the longitudinal free edge of flap 4. The larger of said additional flaps is designated 5 and the smaller 6.

Figure 4:
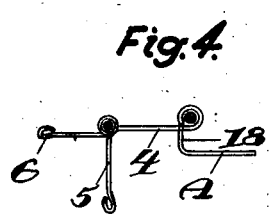
Figures 4, 5 and 6 are views in the direction of the arrow indicated in Figure 3 of the hinged elements, 4, 5 and 6 shown in three different positions.
Figure 5:
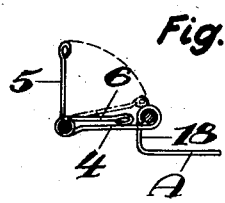
Figure 6:
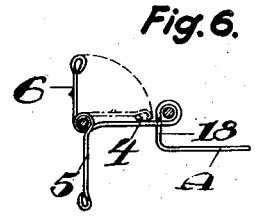
Figure 7:
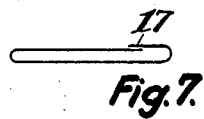

The vertical dimensions of the flaps 4, 5 and 6 with respect to their hinge axes are so proportioned relatively to one another that the flap 6 after being turned through 180° about the common hinge pin from its position shown in Figure 4 assumes the position indicated in Figure 5 between the two hinge pins of the flap 4. All the flaps have rolls or beads along their free edges in order to prevent the paper being damaged by sharp edges. The inner template B is also of substantially rectangular form, but the corner 7 by which the filling opening the bag is formed is cut away, and for the purpose of reducing the weight of the template apertures 8 and 9 are made. Steel plate springs 11 and 12 are riveted to the aluminium plate 10 as shown in Figure 2 and are provided with upwardly inclined limbs. Plates 13 and 14 hereinafter called wings are riveted to these limbs of the plate springs; these are shown in a horizontal position in Figure 2. A bar 15 is arranged on the flank 14 at the cut-away end of the plate 10 and is stiffened by a strut 16.

The outer edges of the inner template B are also rolled in order to avoid sharp edges.

Figure 7:
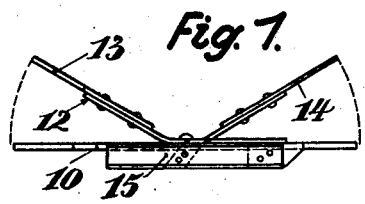
Figure 7 is a cross section.
Figure 8:
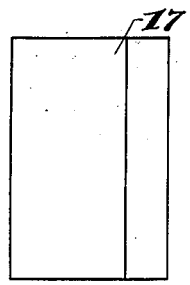
Figure 8 is a plan view of the blank to be formed into the paper bag.
Figure 21:
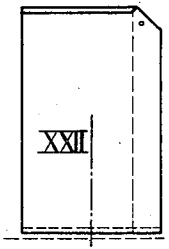
Figure 21 is a plan view showing the bag after being turned over and after glueing of the top flanges.

A paper tube or blank shown in Figures 7 and 8 is made into a finished bag as illustrated in Figure 21 by means of these templates A and B.

Figure 9:
Figures 9 and 10 are an end elevation and plan view respectively of the blank with the templates in position.
Figure 10:
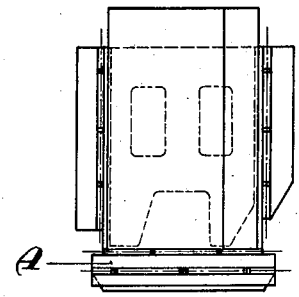

For this purpose the inner template B is inserted in the paper tube 17 (Figures 9 and 10), with the tube resting against the bar 15 and the tube is laid flat on the plate 1 resting on the work bench so that the template B bears with its bar 15 against the upstanding part 18 of the plate 1. The flaps 2, 3 are previously spread out. The tube 17 which is positioned at one end by the bar 15 may have its other end projecting over the opposite edge of the plate 1 which is made of small dimensions for the purpose of making it as light as possible.

Figure 11:
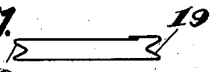
Figures 11 and 12 are an end elevation and plan of the bag after the formation of the side folds and removal of the templates.
Figure 12:
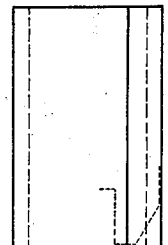

The flap 2 is now grasped with the left hand and the flap 3 with the right hand and they are then both turned through 180° against the tensed parts of the tube between the plate 10 and the flank pieces 13 and 14. The tube and the wings 13 and 14 are thereupon pressed down flat with the result that the longitudinal folds 19 visible in figure 11 are formed in the tube. As soon as the person making the bag releases his hold on the flaps, after the side folds have been made, the wings 11, 12, 13 and 14 spring upwardly again.

Figure 13:
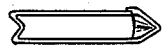
Figures 13 and 14 are similar views to Figures 11 and 12 but show the blank after the production of the valve or ventilating fold and air escape aperture.
Figure 14:
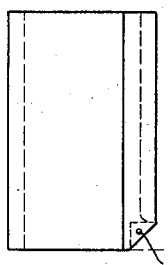

The creases so produced are stroked firmly, and by simply pressing the right forward corner of the tube with the right hand between the inclined corners 7 of plate 10 and the flank 14 the filling aperture is produced, figures 13 and 14. These folds also are stroked firmly. An air vent 22 (Figure 14) which passes through all the layers is formed by means of a punch.

The inner template B is then withdrawn from the tube, the flap 6 is brought into the position shown in figure 5, and the large flap 5 is turned into a perpendicular position. The tube end is then brought against the flap 5 whereupon the latter is pressed down on the tube as indicated in dotted lines in the same figure.

Figure 15:
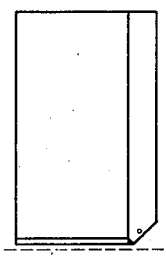
Figure 15 is a plan view of the bag showing the bottom thereof folded over or creased.

The group of flaps 4, 5, 6, together with the end of the tube gripped thereby are now turned through 180° about the pin by which the flap 4 is hinged to the part 18 of the plate 1, whereby this end of the tube is creased, Figure 15, at a distance from the end of the tube determined by the width of the flap and then freed by turning back the flaps.

Figure 16:
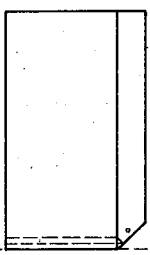
Figure 16 is a plan view showing the bag after the bottom folded portion has been turned back again to its original position, partly severed and re-folded.
Figure 17:
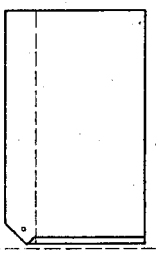
Figure 17 is a plan view of the bag after the latter has been turned over and the bottom cemented or glued.
Figure 22:
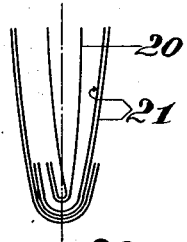
Figure 22 is a sectional elevation on an enlarged scale on the line XXII—XXII of Figure 21.

As in practice the paper tube consists of several layers for example, as is assumed in Figures 16, 22, three tubes, two layers of the tube are cut with a knife at both small sides up to the crease, provided with adhesive, and folded, and the folded strips adhere in such a manner that the bag, Figure 17 receives the cross section diagrammatically shown in Figure 22 in which an inner bag 20 is independently and freely suspended within the double layer outer bag 21, the layers of which are stuck together along their edges and thus form four layers which, in conjunction with the adhesive, give great tenacity or strength to the bottom of the bag.

Figure 18:
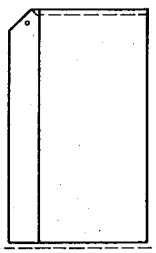
Figure 18 is a plan view showing the bag turned around.
Figure 19:
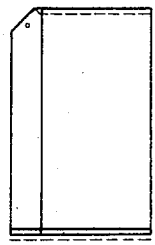
Figure 20:
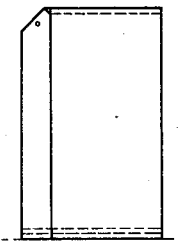
Figure 20 is a plan view of the bag after the fold has been made to assume its former position and after partial separation and refolding of the top flanges.

The bag is now turned end for end from the position in Figure 16 into the position shown in Figure 17 and then into the position indicated in Figure 18. It is then placed with its front end, previously the rear end, against the upstanding flap 6, which is in the position shown in Figure 6. The flap 6 is then turned into the dotted position and together with the flap 4 is turned through 180° about the hinge pin of the latter on the edge 18, whereby this end of the tube is also creased, but at a distance from the tube end determined by the width of the flap 6. The fold produced is of shallow depth, Figure 19, with the result that in the mass production of the bags large economy in paper is effected. After this, the tube is stroked firmly, cut, glued, tucked-in and pressed flat as above described and thus a bag with ends having the cross section shown in Figure 22 is produced ready for immediate use after drying. The drying is completed in an extraordinarily rapid manner because all the places provided with adhesive are on the outside, and are consequently readily accessible to the air. As the piercer of the above mentioned punch passes through all the layers of paper gripped thereby, sufficient provision is made for escape of air, the air vents 22 being so small, that they do not allow of escape of dust.

Figure 23:
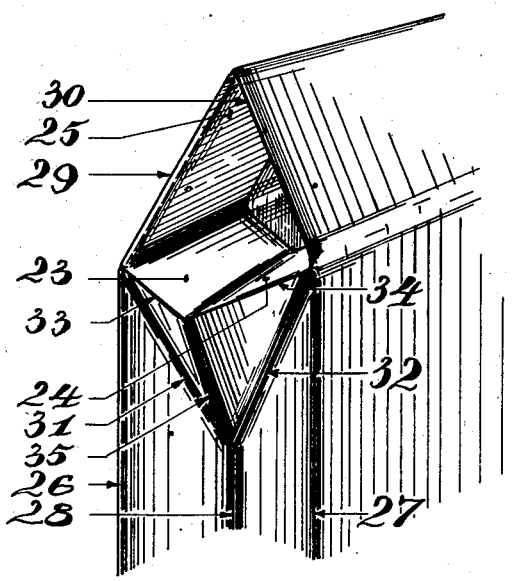
Figure 23 is a perspective view of the open filling valve, and uncovered de-aerating apertures.
Figure 24:
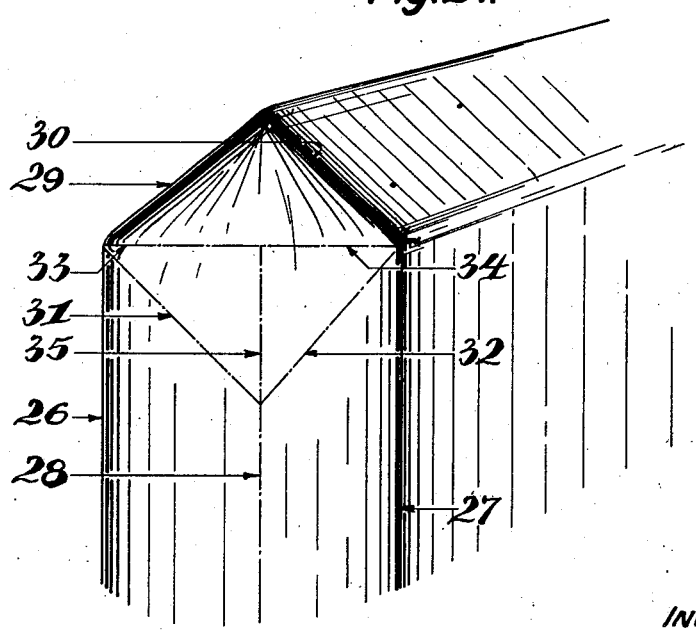
Figure 24 is a perspective view of the closed filling valve and covered air vents.

When after the bag has been filled, the filling tube nozzle is withdrawn from the filling opening, Figure 23, the filling material raises the valve surfaces 23, 24, whilst the two surfaces 25 disposed above them approach them until the imperforate surfaces 23, 24 register with the two perforated surfaces 25 and is this position, Figure 24 closes the air escape aperture 22. In order that the closing operation can be clearly followed from the drawings, the edges of the bag and the closing valve well defined in Figure 23, and the still more or less visible edges in Figure 24 and also the positions of the edges which disappear in the stretching of the paper caused by the expansion of the bag under the influence of the filling are provided with one and the same reference letters.

I claim:—

1. A folding device for the manufacture of paper bags by hand comprising an inner template for acting on the interior of a paper tube to be folded into a bag, and a separate outer template for acting on the exterior of said paper tube.

2. Means comprising an inner template for acting on the interior of a paper tube to be formed into a bag, an outer template for acting on the exterior of said paper tube, and elements hinged to the longitudinal edges of said outer template for producing lateral creases in said tube.

3. Means comprising an inner template for acting on the interior of a paper tube to be formed into a bag, an outer template for acting on the exterior of said paper tube and an element hinged to one transverse edge of said outer template for creasing each end of the paper tube in turn.

4. Means comprising an inner template for acting on the interior of a paper tube to be formed into a bag, an outer template for acting on the exterior of said paper tubes, elements hinged to the longitudinal edges of said outer template for producing lateral creases in said tube, and an element hinged to one transverse edge of said outer template for creasing each end of the paper tube in turn.

5. Means comprising an inner template for acting on the interior of a paper tube to be formed into a bag, an outer template for acting on the exterior of said paper tube, an element hinged to one transverse edge of said outer template for creasing each end of the paper tube in turn, and two superposed flaps hinged to the free longitudinal edge of said hinged element for creasing the bag containing the filling valve and the opposite end of said bag respectively.

6. Means comprising an inner template for acting on the interior of a paper tube to be formed into a bag, an outer template for acting on the exterior of said paper tube, a relatively shallow plate extending substantially perpendicularly from a transverse edge of said outer template, an element hinged to the free longitudinal edge of said shallow plate, and two superposed flaps hinged to the free longitudinal edge of said hinged element, the height of said shallow plate being such as to accommodate the hinged element and flaps to the rear thereof.

7. Means comprising an inner template for acting on the interior of a paper tube to be formed into a bag, an outer template for acting on the exterior of said paper tube, and resilient wing elements mounted on both sides of the longitudinal axis of said inner template and extending upwardly and outwardly therefrom.

8. Means comprising an inner template for acting on the interior of a paper tube to be formed into a bag, an outer template for acting on the exterior of said paper tube, and an abutment member bounding one end edge of said inner template.

9. Means comprising an inner template for acting on the interior of a paper tube to be formed into a bag, an outer template for acting on the exterior of said paper tube, resilient wing elements mounted on both sides of the longitudinal axis of said inner template and extending upwardly and outwardly therefrom, and an abutment member bounding one end edge of said inner template.

In testimony whereof I have signed my name to this specification.

ALFONS PELZ.